United States Patent
Durney et al.

(10) Patent No.: US 10,113,265 B2
(45) Date of Patent: Oct. 30, 2018

(54) LAUNDRY SOCK/GARMENT SNARE

(71) Applicant: Laundry Loops, Inc., Bozeman, MT (US)

(72) Inventors: Peggy R. Durney, Bozeman, MT (US); Michael J. Durney, Bozeman, MT (US)

(73) Assignee: Laundry Loops, Inc., Bozeman, MT (US)

( * ) Notice: Subject to any disclaimer, the term of this patent is extended or adjusted under 35 U.S.C. 154(b) by 167 days.

(21) Appl. No.: 15/193,094

(22) Filed: Jun. 26, 2016

(65) Prior Publication Data
US 2016/0376745 A1    Dec. 29, 2016

Related U.S. Application Data

(60) Provisional application No. 62/185,033, filed on Jun. 26, 2015.

(51) Int. Cl.
| | | |
|---|---|---|
| *D06F 95/00* | (2006.01) | |
| *A44B 13/02* | (2006.01) | |
| *F16B 2/10* | (2006.01) | |
| *A41B 11/00* | (2006.01) | |

(52) U.S. Cl.
CPC ............ *D06F 95/008* (2013.01); *A44B 13/02* (2013.01); *F16B 2/10* (2013.01); *A41B 11/002* (2013.01)

(58) Field of Classification Search
CPC ..... D06F 95/008; A44B 13/02; A41B 11/002; F16B 2/10
See application file for complete search history.

(56) References Cited

U.S. PATENT DOCUMENTS

| | | | | |
|---|---|---|---|---|
| 1,681,122 | A | * 8/1928 | Lebwohl | D06F 95/008 24/709.2 |
| 2,879,990 | A | * 3/1959 | Eaton | A41H 31/005 24/302 |
| 3,688,348 | A | * 9/1972 | Klotz | B65D 71/00 211/113 |
| 5,234,139 | A | * 8/1993 | Korenstein | A47G 25/14 223/85 |
| 5,551,128 | A | 9/1996 | Townsend | |
| 5,697,128 | A | * 12/1997 | Peregrine | F16G 11/14 24/115 G |
| 6,038,748 | A | 3/2000 | Durney et al. | |
| 6,389,657 | B1 | 5/2002 | Turner | |
| 7,631,753 | B1 | 12/2009 | Temmel | |

(Continued)

*Primary Examiner* — Robert Sandy
*Assistant Examiner* — Louis A Mercado
(74) *Attorney, Agent, or Firm* — Husch Blackwell LLP

(57) ABSTRACT

A laundry holding snare device for holding multiple clothing items, particularly clothing items without full openings, is provided. The snare device can include two cord sections secured together at at least one end by an end stopper. The two cord sections can also be secured together at various locations along the length of the snare by intermediate stoppers in order to create several loading regions. Within the loading regions and attached to the cord sections can be a cordlock fastener that can be used to secure the clothing items between the cord sections at each loading region. The snare device can be configured for use as a stand-alone laundry device and the snare device can be configured for use with a laundry strap holder.

12 Claims, 7 Drawing Sheets

(56) References Cited

U.S. PATENT DOCUMENTS

| | | | | |
|---|---|---|---|---|
| 8,292,098 B2* | 10/2012 | Szegfi | ................... | A47K 10/22 |
| | | | | 211/113 |
| 2003/0231810 A1* | 12/2003 | Durney | ................. | B65D 33/01 |
| | | | | 383/74 |
| 2014/0137426 A1* | 5/2014 | Woodson | ............. | D06F 95/008 |
| | | | | 34/239 |
| 2016/0278440 A1* | 9/2016 | Kaspi | ................... | A41B 11/002 |
| 2017/0009394 A1* | 1/2017 | Durney | ................ | D06F 95/008 |

\* cited by examiner

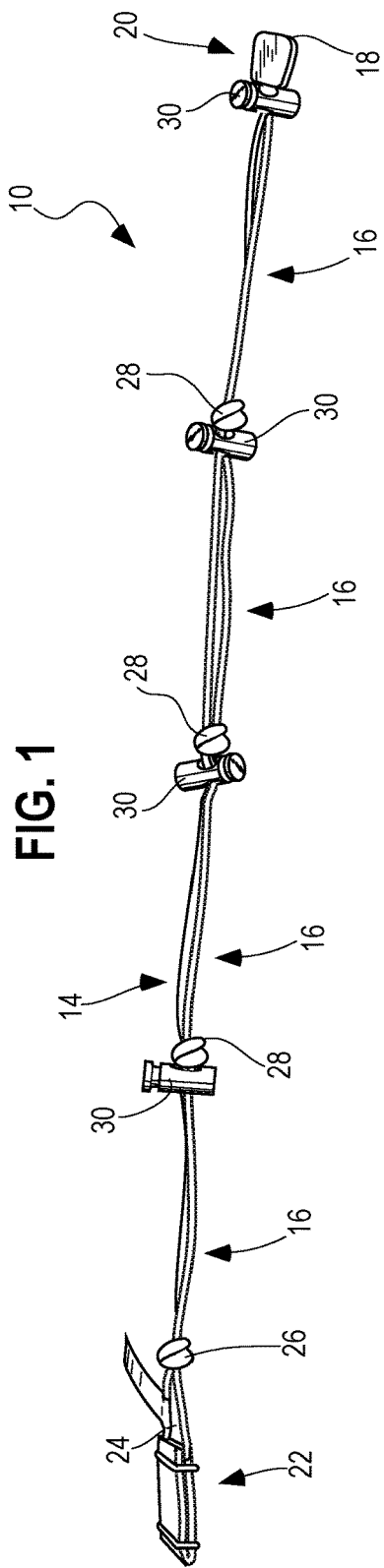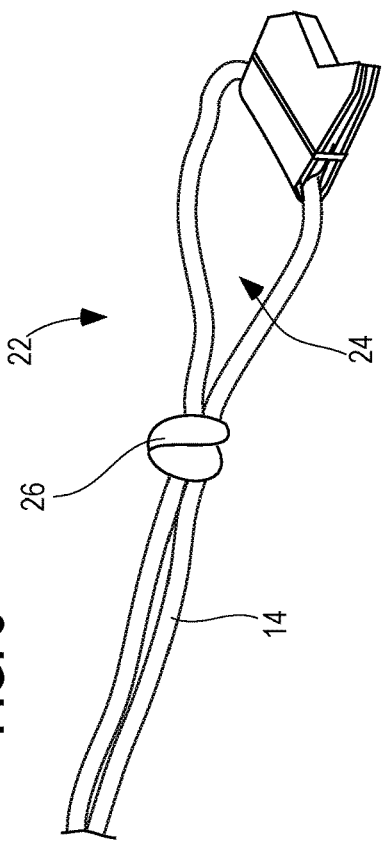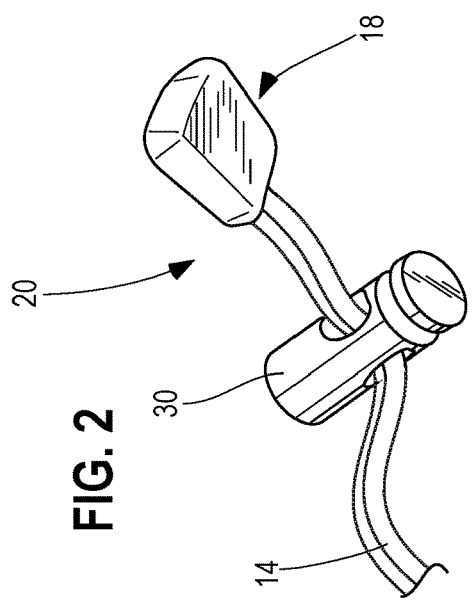

LAUNDRY SOCK/GARMENT SNARE

CROSS-REFERENCE TO RELATED APPLICATIONS

This application claims priority to U.S. Provisional Patent Application Ser. No. 62/185,033, filed on Jun. 26, 2015, to Peggy R. Durney et al., entitled "Laundry Sock/Garment Snare," currently pending, the entire disclosure of which is incorporated herein by reference.

FIELD OF THE INVENTION

The present invention relates to a device for holding an individual's laundry, including sock, caps, gloves and the like, when laundering a single individual's clothing at home and when several individuals' clothing is laundered together in single loads.

BACKGROUND OF THE INVENTION

There are commonly situations where multiple individuals' laundry needs to be laundered together in a single load. In such situations, it is necessary to keep each individual's laundry separated from the other individuals' laundry. Additionally, often times an individual has several items, such as socks, caps, gloves and the like, without slots or openings that must be laundered. Several different devices have been used to accomplish this goal, each having its own limitations and deficiencies. For example, U.S. Pat. No. 5,551,128 to Townsend discloses a laundry device with two fixed-dimension laundry devices, one for clothing items and another for socks and the like. However, this sock holding device is difficult to use when a large number of socks are to be washed, or when only one or a few pairs of lightweight socks are to be washed, because the device cannot be adequately adjusted. Additionally, this device requires that a significant area of socks and the like to remain enclosed by the device, minimizing its effectiveness in both washing and drying the enclosed garments. Another laundry device is disclosed in U.S. Pat. No. 6,038,748 to Peggy R. Durney and Michael J. Durney, the entire disclosure of which is herein incorporated by reference. In that invention, the laundry device included a sock snare attached to the main belt that included two cords and a threaded cord lock fastener connecting the two cords. Socks could be inserted between the cords and then cinched together using the cordlock fastener. However, the sock snare is effective only when one or two pairs of socks are placed in the sock snare as the socks fail to get adequately cleaned and/or dried when more than two pairs of socks are cinched together.

It is also not uncommon for clothing items, such as socks, caps, gloves and the like to become lost or mismatched during the laundering process, even when laundering only a single individual's clothing at home. Various devices have previously been designed in an effort to prevent this problem. For example, U.S. Pat. Nos. 6,389,657 to Darlyn C. Turner and 7,631,753 to Thomas G. Temmel each disclose respective sock laundering devices for holding pairs of socks together using clips. However, similar to the laundering devices described above, each of these designs have been ineffective and inefficient.

In view of the foregoing, what is needed is a laundry holder for socks and the like which is efficient and easy to use for at-home use, when a single individual's clothing is laundered, and when multiple individuals' clothing are laundered at once. Further, a laundry holder for socks, cap, gloves or other lightweight clothing items, is needed that can effectively, during the washing and drying thereof, hold and separate several pairs of socks and/or shirts, underwear and the like while keeping an individual's laundry separate from other individuals' laundry during the washing and drying process.

SUMMARY OF THE INVENTION

The present invention is directed generally to a clothing or garment snare. The garment snare can be designed to hold and secure in place one or more items of clothing, and in particular, clothing items without appropriate slots such as socks, caps, gloves, towels and other similar items. The garment snare can be configured for use as a stand-alone device or for attachment to a laundry holder depending on the particular embodiment.

The snare can be constructed from a single length of cording folded in half so that two cord sections are positioned generally adjacent to one another or from two individual cord sections. Each end of the snare can then be secured together at its ends using any suitable type of stopper or other cord securing means, such as but not limited to a knot, a tab, a clip, snap hook or the like in order to form a continuous loop. According to one embodiment, rather than securing both ends, one end is secured to a laundry holder and the other end is secured together using the cord securing means. Intermittently placed between the ends of the cord can be a plurality of intermediate stoppers. The intermediate stoppers can be formed as any type of knot, clip or clamp or formed through a crimping device or other suitable means. The application or formation of the intermediate stoppers forms the individual loading regions of the snare, where each loading region can be defined as the loop of gap between two intermediate stoppers or between one intermediate stopper and one end stopper. The loading regions can be designed to hold the various clothing or garment items intended to be used in connection with the snare.

In order to secure the laundry or garment items within the loading regions, each loading region can have a cordlock fastener connected to the two cord sections within the loading region. The cordlock fastener can be permanently attached to the snare or removably attached depending on the particular embodiment of the present invention. According to one embodiment, the cordlock fastener can be a conventional releasable cordlock fastener that is threaded with the first and second cord sections so that it may be slidably moved along the length of cording in the particular loading region.

In order to use the snare, the clothing item can be placed through the loading region so that it rests between the first and second cord sections. The cordlock fastener can then be used to cinch or otherwise secure the clothing item against one end of the loading region (e.g., intermediate or end stopper). As a result, the clothing item can be snuggly secured between the cordlock fastener and the intermediate or end stopper of the loading region.

In a second embodiment of the present invention, the snare can be constructed from a single length of cord. Similar to the embodiment described above, the snare can include a first and second ends constructed with a stopper or other cord securing means, such as but not limited to a knot, a tab, a clip, snap hook or the like. One of the ends can also be formed as an enclosed loop from the length of cord. In addition, the snare according to this embodiment can have intermediate stoppers intermediately spaced along the length of the snare. However, in this embodiment, instead of having loading regions formed from two cord sections, the snare can include one or more serrated jaw clamps. These jaw clamps can connected to the cord and can clamp and secure garments in a spaced configuration along the length of the snare.

Other aspects and advantages of the present invention will be apparent from the following detailed description of the preferred embodiments and the accompanying drawing figures.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views:

FIG. 1 is a perspective view of a laundry sock/garment snare in accordance with one embodiment of the present invention;

FIG. 2 is a perspective view of an end of a laundry sock/garment snare illustrating a locking cord tab in accordance with one embodiment of the present invention;

FIG. 3 is a perspective view of an end of a laundry sock/garment snare illustrating a loop end in accordance with one embodiment of the present invention;

DETAILED DESCRIPTION OF THE INVENTION

Figure 4:
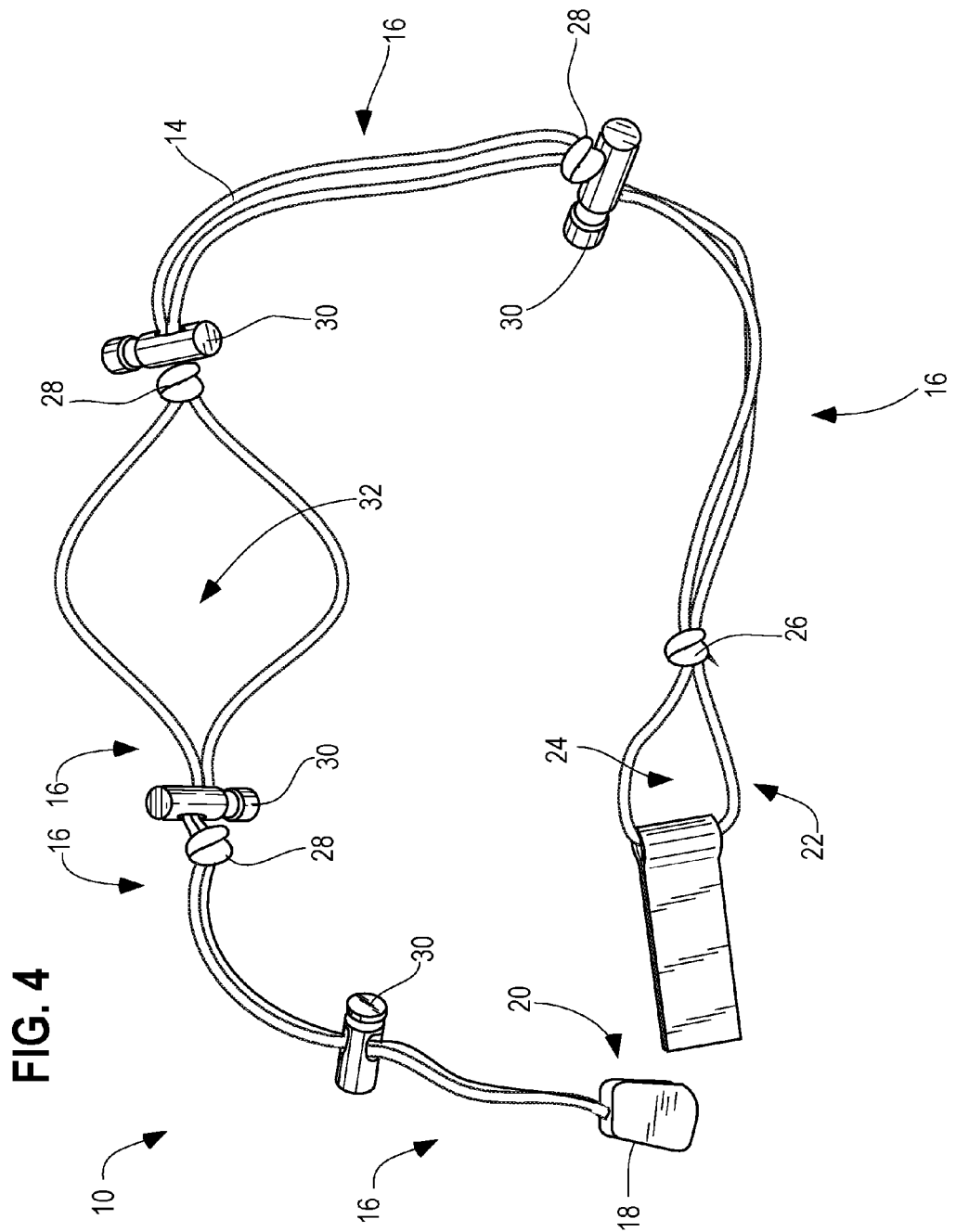
FIG. 4 is a plan view of the laundry sock/garment snare of FIG. 1 illustrating a sock loading region.
Figure 5:
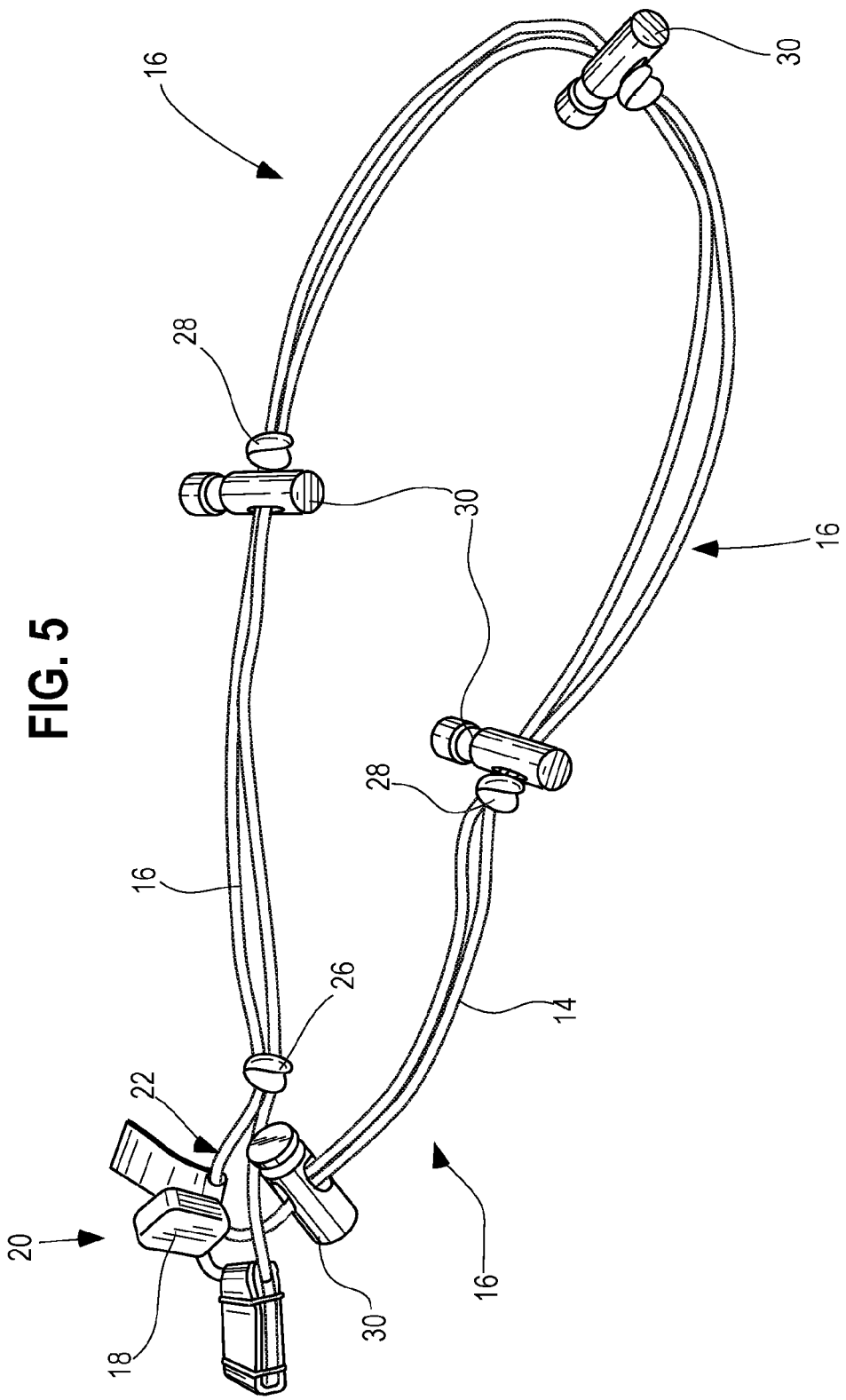
FIG. 5 is a perspective view of the laundry sock/garment snare of FIG. 1 in a looped configuration.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Figure 6:
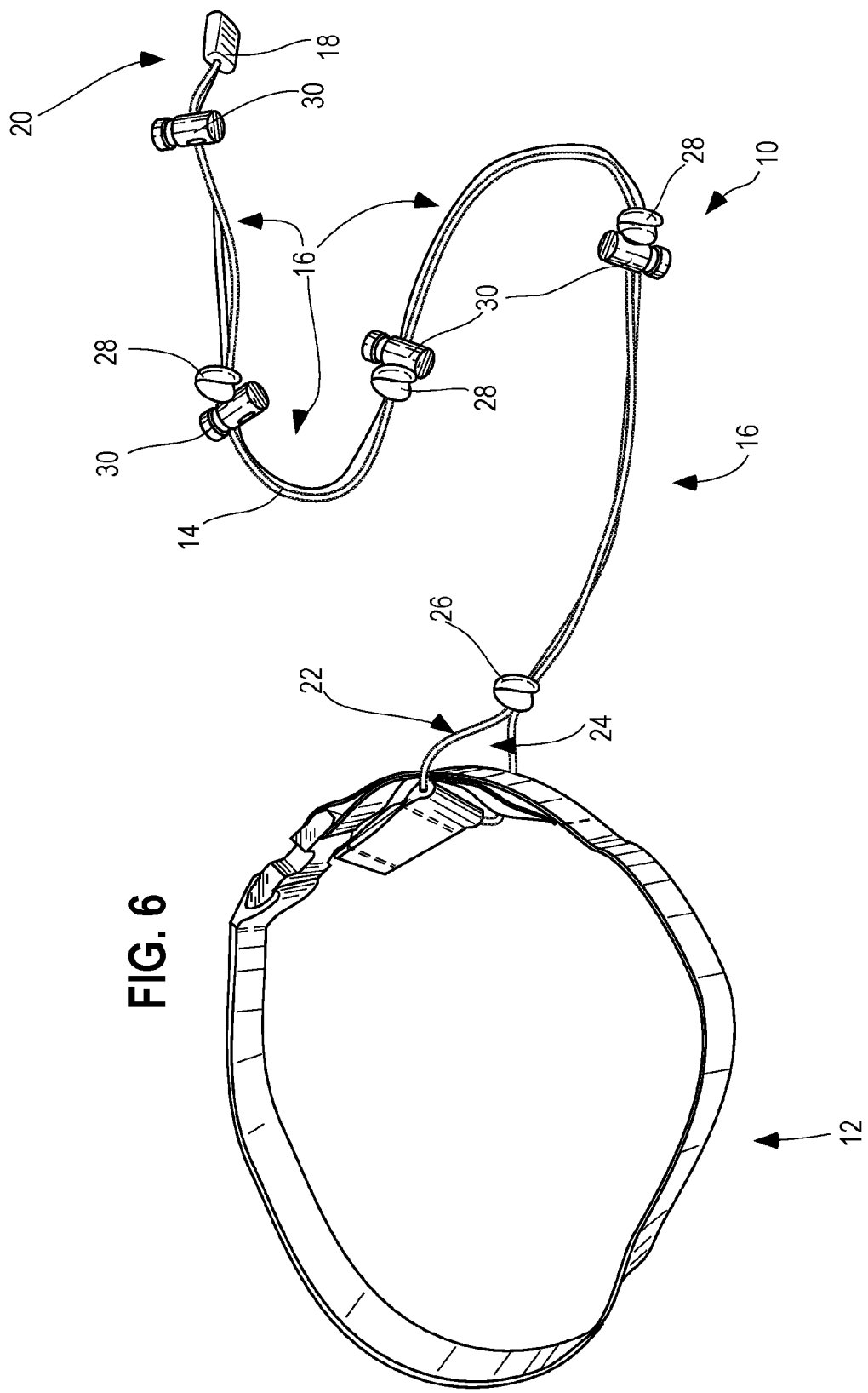
FIG. 6 is a perspective view of a laundry sock/garment snare connected to a laundry device in accordance with one embodiment of the present invention.
Figure 7:
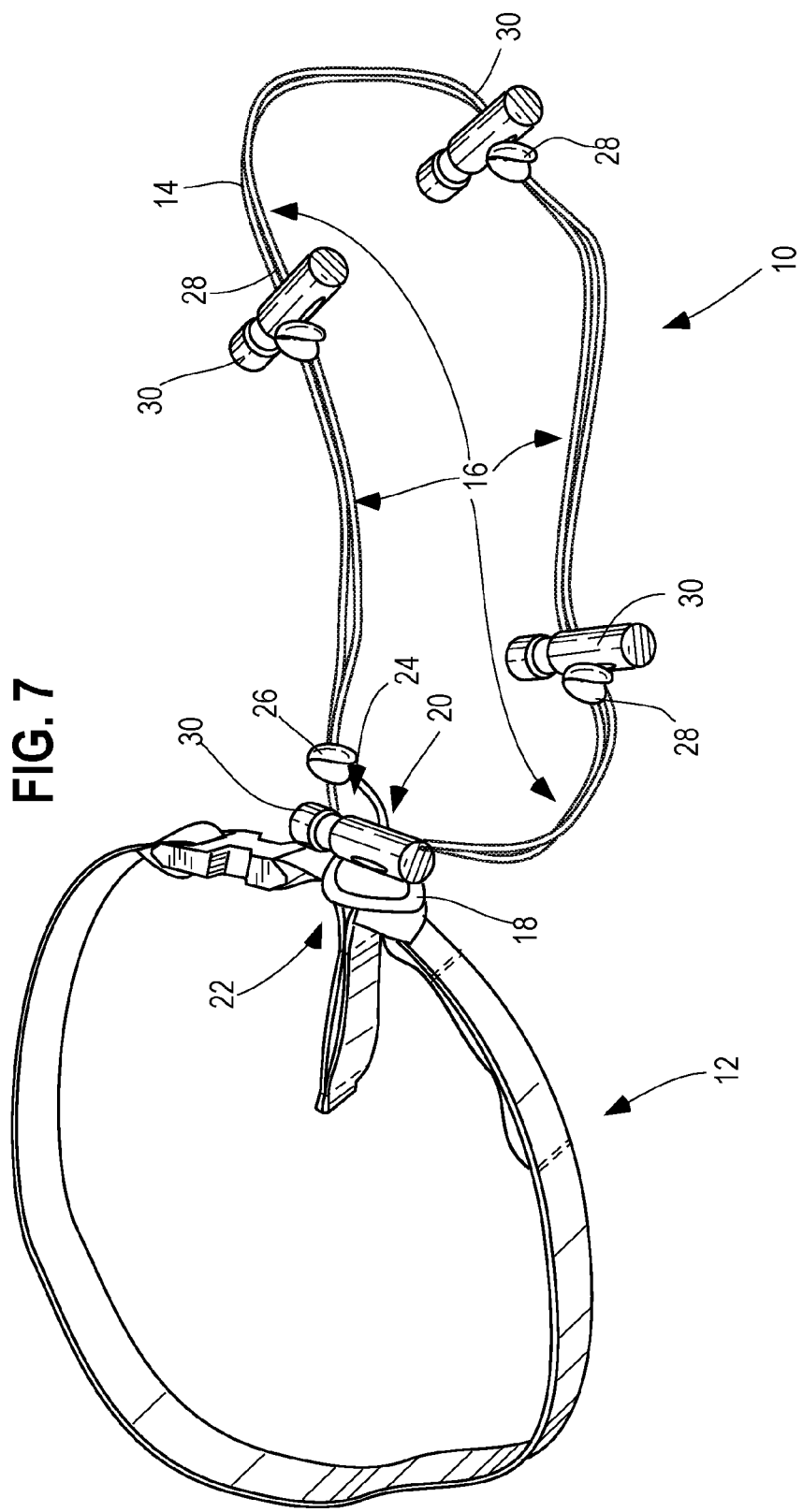
FIG. 7 is a perspective view of a laundry sock/garment snare in a looped configuration connected to a laundry device in accordance with one embodiment of the present invention.

The present invention is generally directed to a laundry sock/garment snare 10, as shown in FIG. 1, that can be used separately or in conjunction with a laundry device 12, as shown in FIGS. 6 and 7. The sock/garment snare 10 allows a user to effectively launder multiple items, such as socks, caps, gloves, towels and other similar items without slots or openings. Due to the configuration of the sock/garment snare 10, the multiple items may be spread out and separated along the sock/garment snare 10 so that each item may be effectively washed and dried. The sock/garment snare 10 also allows a user to use the sock/garment snare 10 in either an elongated configuration or a looped configuration, depending on the user's preference, to minimize any tangling of the sock/garment snare 10 with other garments while laundering.

Figure 9:
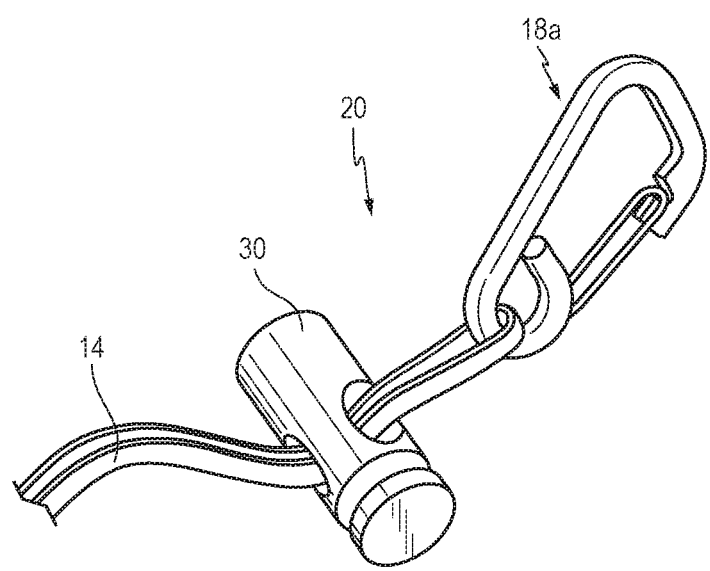
FIG. 9 a perspective view of an end of a laundry sock/garment snare illustrating a snap hook in accordance with one embodiment of the present invention.

The sock/garment snare 10 can be made from a length of cording 14 that may be separated in to a plurality of sock/garment loading regions 16. The loading regions can be formed from cord sections from the length of cording or from jaw clamps as described in greater detail below. The embodiment shown in FIG. 1 demonstrates a sock/garment snare 10 with four loading regions. However, the sock/garment snare 10 may include several other quantities of loading regions not displayed in the figures. The cording 14 can be of several different lengths as long as the sock/garment snare 10 is long enough to accommodate the desired number of loading regions 16. The cording 14 may have two individual cord strands formed by either by looping a single strand of cord in half or securing two individual strands of cord together. The free ends of the two cord strands of the cording 14 may be secured together using a locking cord tab 18, as best shown in FIG. 2 to form a first end 20 of the sock/garment snare 10. In an alternative embodiment, the free ends of the two cord strands of the cording 14 may be secured together using a snap hook 18a (shown in FIG. 9) constructed from plastic, metal or the like. The free ends may also be secured using a knot or other suitable device or method to form first end 20. An opposing end, or second end 22, of the sock/garment snare 10 may be a closed loop 24 as best shown in FIG. 3. The closed loop 24 may be closed by an end stopper 26, such as a half-hitch knot or other knot, near the end of the cording 14 as shown in FIG. 3. The closed loop 24 should be large enough to receive a strap of a laundry device 12.

A plurality of intermediate stoppers 28 may be located between the first end 20 and the second end 22 of the sock/garment snare 10. The intermediate stoppers 28 may be formed as half-hitch knots or other knot, by a crimping device, or any other method commonly known or hereinafter developed. The stoppers 28 may form the boundaries of the loading regions 16 as best shown in FIG. 1. The stoppers 28 (and 26) secure the two cord strands together at specific locations along the cording 14. As shown in FIG. 1, the stoppers 28 may be generally evenly spaced across the sock/garment snare 10 to folio similar sized loading regions 16, according to one embodiment. In alternative embodiments, the stoppers 28 may be placed at varying locations across the sock/garment snare 10 to form differentially sized loading regions 16.

Between two intermediate stoppers 28 may be a releasable cordlock fastener 30, or similar device that may be selectively positioned along cording 14 and temporarily locked in position. In one embodiment, the releasable cordlock fastener 30 is a conventional acetal cordlock that is threaded with the two cord strands and has a spring biased plunger. When the plunger is depressed, the cordlock 30 may be slidably moved on the cording 14, and when the plunger is released, the cordlock 30 is secured in its current position. A releasable cordlock fastener 30 may also be placed between the end stopper 26 and intermediate stopper 28. As described in greater detail below (and shown in FIG. 8), in an embodiment where a jaw clamp 32 is used for forming loading regions 16, cordlock fasteners 30 and intermediate stoppers 28 and even end stoppers 26 are not necessary.

The sock/garment snare 10 may be used independently to hold and launder socks, gloves, caps and similar items without slots or openings, in an elongated configuration, as shown in FIG. 1, or in a looped configuration, as shown in FIG. 4. When in the looped configuration, the first end 20 may be inserted through the closed loop 24 of the second end 22 and secured. In one embodiment, the first end 20 is secured to the second end 22 by inserting the locking cord tab 18 through the closed loop 24 and tying the cording 14 of the first end 20 to the cording of the second end 22. In an alternative embodiment, a snap hook or similar device 18*a* (see FIG. 9) is used in place of locking cord tab 18 and can secure first end 20 to second end 22 by connecting the hook 18*a* to the loop 24 of second end 22. Several other suitable methods to secure first end 20 to second end 22 may also be used in other embodiments.

The sock/garment snare 10 may also be used in conjunction with a laundry device 12, as best shown in FIGS. 6 and 7. When used in conjunction with a laundry device 12, a strap of the laundry device may be inserted through the closed loop 24 of the second end 22 before buckling the straps of the laundry device 12 together. The laundry device 12 and sock/garment snare 10 may be laundered with the sock/garment snare 10 in an elongated configuration as shown in FIG. 6, or the sock snare may be in a looped configuration as shown in FIG. 7. When the sock/garment snare 10 is connected to the laundry device 12 and in the elongated configuration, the strap of the laundry device 12 is inserted through closed loop 24 of the second end 22. Then the laundry device 12 may be buckled together. In this configuration, the first end 20 of the sock/garment snare 10 is not attached to the laundry device 12 ©r to the second end 22 of the sock/garment snare 10. Alternatively, when a snap hook 18*a* (see FIG. 9) is used in place of locking cord tab 18, the snap hook 18*a* may be connected to the laundry device 12 and the second end 22 can remain unattached to the laundry device 12 to allow the sock/garment snare 10 to be in the elongated configuration.

When the sock/garment snare 10 is connected to the laundry device 12 and in the looped configuration, the strap of the laundry device 12 is inserted through the closed loop 24 of the second end 22 and the laundry device 12 may be buckled together. The first end 20 may then be secured to the second end 22 of the sock/garment snare 10 as described above. First end may also be secured to the laundry device 12. Alternatively, when the snap hook 18*a* (see FIG. 9) is used in place of locking cord tab 18, the snap hook 18*a* can be connected to the second end loop 24 to place the sock/garment snare 10 into the looped configuration. The sock/garment snare 10 may be loaded with items, such as socks and the like, before or after attaching the sock/garment snare 10 to the laundry device 12. In certain embodiments of the present invention, the laundry sock/garment snare 10 can also be permanently joined or affixed to the laundry device 12.

When loading the sock/garment snare 10 according to a first embodiment with cordlock fasteners 30, a user may position the cordlock fastener 30 against one of the intermediate stoppers 28 or end stopper 18 or 26 of one of the loading regions 16 as best shown in FIG. 4. The user may then separate the two individual cord strands of the cording 14 as shown in FIG. 4 to form an opening 32. By positioning the cordlock fastener 30 against the stopper 28, 26 or 18, the user is able to form the largest possible opening 32 in the loading region 16. The user may then insert items such as socks, caps, gloves and the like through the opening 32 and then move the cordlock fastener 30 toward the inserted items until the items are snuggly located between the cordlock fastener 30 and stopper 28, 26 or 18. The user may then load one or more of the additional loading regions 16 of the sock/garment snare 10 in the same manner.

Figure 8:
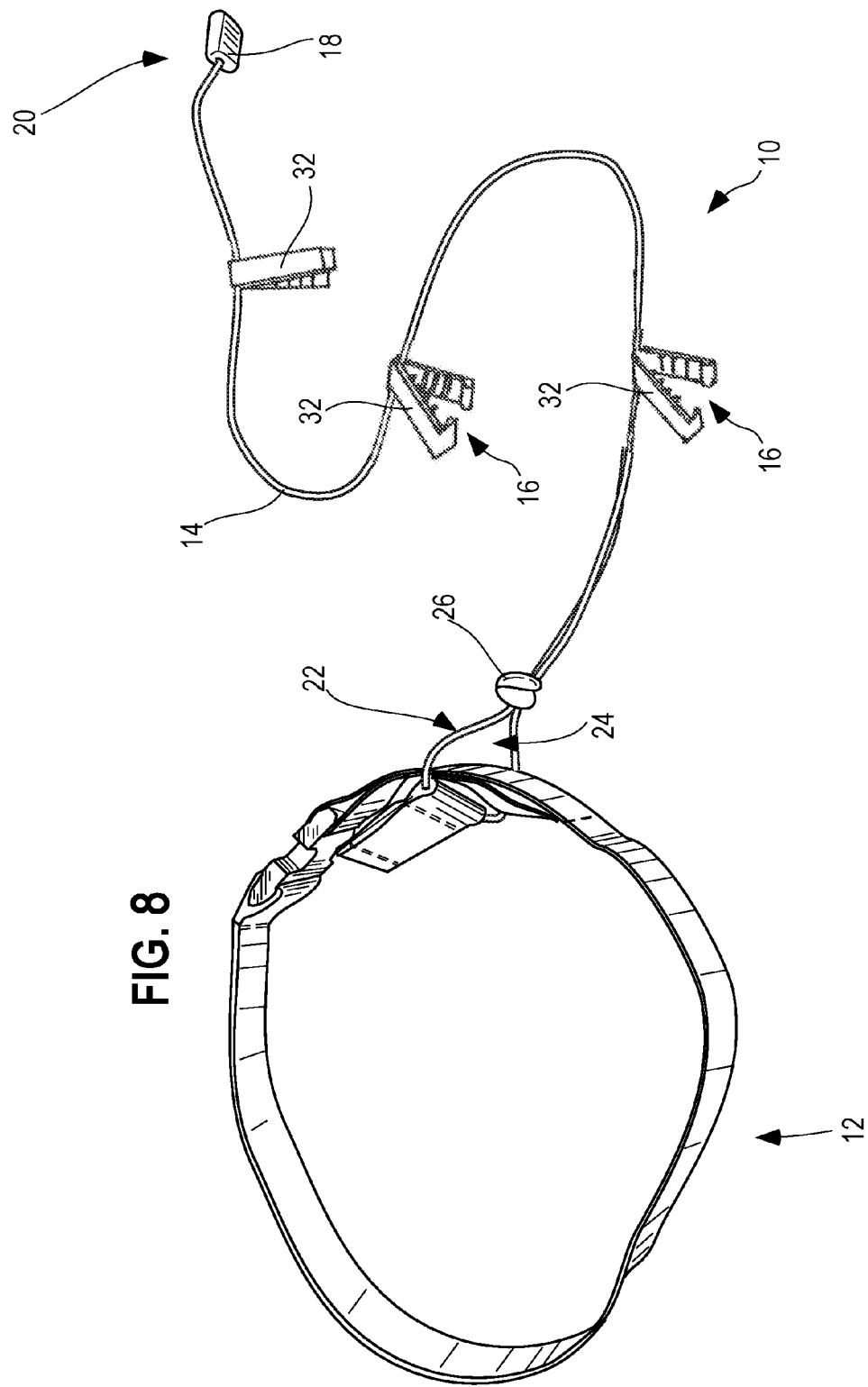
FIG. 8 is a perspective view of a laundry sock/garment snare connected to a laundry device in accordance with another embodiment of the present invention.

According to a second embodiment, sock/garment snare 10 can optionally be constructed with length of cording 14 as best shown in FIG. 8. As also shown in FIG. 8, snare 10 can include cord tab 18 at first end 20 and an enclosed loop 24 formed by cording 14 at second end 22. As also described above, snare 10 can additionally optionally include end stoppers 26 and intermediate stoppers 28. However, as best illustrated in FIG. 8, loading regions 16 are not formed by the spacing between the two cord sections of cording 14 and instead formed from jaw clamps 32. As shown in FIG. 8, snare 10 can have a plurality of jaw clamps 32 positioned along the length of snare 10 or just a single jaw clamp 32 depending on the particular embodiment. Jaw clamps 32 can be any suitable type of jaw clamp, such as a serrated jaw clamp having one or more notches or teeth and can be constructed from plastic, metal or other suitable material. Jaw clamps 32 can be threaded through cording 14 or otherwise connected to cording 14 in a spaced apart manner. Jaw clamps 32 can be configured to open and close at one end to form loading region 16 so as to allow a user to insert a garment or pair of garments into the opened end of jaw clamp 32 and then secure the jaw clamp 32 shut so that the garment(s) remain attached to the jaw clamp 32. Similar to as described above, snare 10 configured with jaw clamps 32 can be configured for independent use or to be used in conjunction with a laundry device 12 as shown in FIG. 8.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A laundry snare for laundering a plurality of items, the laundry snare comprising:
   two elongated cord strands having:
   a first end wherein the two cord strands are connected together; and
   a second end wherein the two cord strands are connected together;
   a plurality of loading regions located between the first and second ends formed by a plurality of stoppers positioned along a length of the two cord strands and securing the two cord strands together; and
   a plurality of releasable cordlock fasteners placed between two of the plurality of stoppers and configured to be selectively located and secured between the two of the plurality of stoppers;
   wherein the releasable cordlock fasteners are threaded through the two cord strands.

2. The laundry snare of claim 1 further comprising a closed loop located at the second end and closed by an end stopper securing the two cord strands together.

3. The laundry snare of claim 1, wherein the stoppers are knots formed by tying the two cords strands.

4. The laundry snare of claim 1, wherein the first end is formed by connecting the two cord strands together with a cord lock tab.

5. The laundry snare of claim 1, wherein the first end is formed by connecting the two cord strands together with a snap hook.

6. The laundry snare of claim 1, wherein the two cords strands are formed from a folded single cord strand.

7. A laundry snare for use in conjunction with a laundry device, the laundry snare comprising:
   an elongated length of cording comprising:
   a first end;
   a second end comprising a closed loop formed by an end stopper securing the elongated length of cording to itself; and
   an elongated body located between the first and second ends;
   a plurality of garment holding sections;
   two elongated cord strands forming the elongated length of cording, wherein the two elongated cord strands are connected together to form the first end and the two elongated cord ends are secured together by the end stopper to form the closed loop;
   a plurality of loading regions forming the plurality of garment holding sections, the plurality of loading regions located along a body of the laundry snare formed by a plurality of stoppers located along the elongated body, wherein the stoppers secure the two cord strands together and wherein the loading regions are defined by a space created between two of the stoppers; and
   a releasable cordlock fastener located in each loading region between two of the stoppers, wherein each releasable cordlock fastener is threaded through the two cord strands, and wherein each releasable cordlock fastener is configured to be selectively located and secured between two of the stoppers.

8. The laundry snare of claim 7, wherein the second end is attached to the laundry device.

9. The laundry snare of claim 7, wherein the first end is formed by connecting the two cord strands together with a cord lock tab.

10. The laundry snare of claim 7, wherein the first end is formed by connecting the two cord strands together with a snap hook.

11. The laundry snare of claim 10, wherein the first end is connected to the laundry device.

12. A laundry snare for use in conjunction with a laundry device, the laundry snare comprising:
    an elongated length of cording comprising:
    a first end:
    a second end comprising a closed loop formed by an end stopper securing the elongated length of cording to itself; and
    an elongated body located between the first and second ends; and
    a plurality of garment holding sections, wherein said plurality of garment holding sections are formed from a plurality of jaw clamps attached to said elongated body of said snare.

* * * * *